F. P. BUSH.
Mash Cooler.

No. 70,518.

Patented Nov. 5, 1867.

Witnesses:

United States Patent Office.

FRANKLIN P. BUSH, OF CINCINNATI, OHIO, ASSIGNOR TO HIMSELF AND JEPTHA GARRARD, OF SAME PLACE.

Letters Patent No. 70,518, dated November 5, 1867.

IMPROVED MASH-COOLER.

The Schedule referred to in these Letters Patent and making part of the same.

TO WHOM IT MAY CONCERN:

Be it known that I, FRANKLIN P. BUSH, of Cincinnati, Hamilton county, Ohio, have invented a new and useful Improvement in Mash-Coolers; and I hereby declare the following to be a full, clear, and exact description thereof, reference being had to the accompanying drawings, making part of this specification.

My invention consists in the provision of one or more coils of cold-water pipes, which are caused to rotate within the mash-tub or tun, so as to both stir and cool the mash, said coils discharging their heated water into a central well or waste-way.

Figure 1:
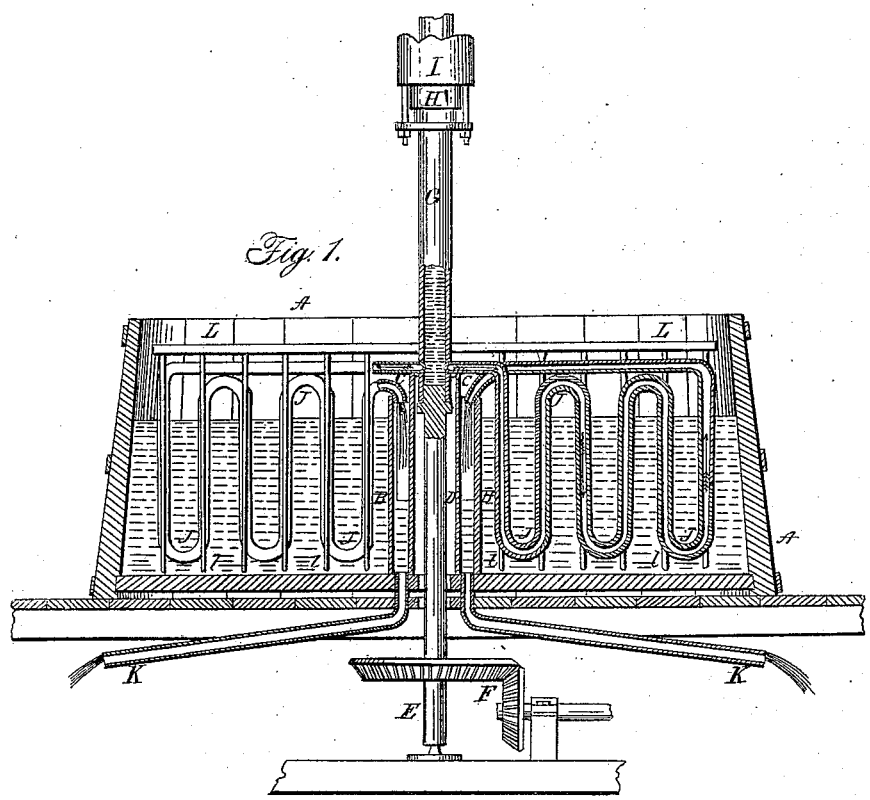
Figure 1 is an axial section of a mash-tun provided with my improvement.
Figure 2:
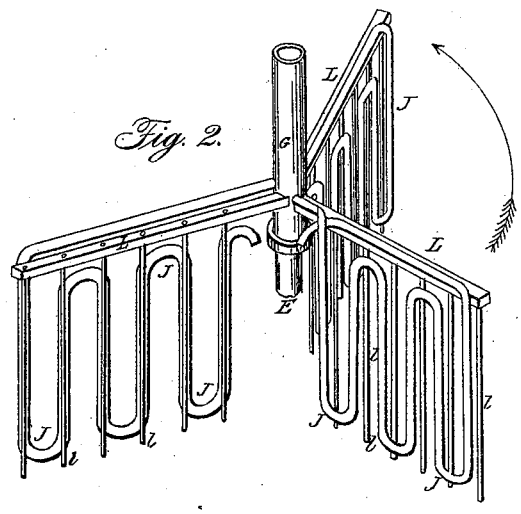
Figure 2 is a perspective view of the rotary coil.

A represents the mash-tun or tub. B and C are concentric cylinders which, rising from the tub-bottom at its centre, enclose between them an annular well or waste-way, D. E is a shaft, which rises through the tub-bottom at the precise centre thereof, and is rotated by gearing F, or other suitable means. The shaft E is surmounted by a pipe, G, which revolves with it, and terminates in a stuffing-box, H, which receives the discharging end of a stationary cold-water pipe, I. Extending horizontally from the pipe G are two or more branches J, bent into the represented coiled form, and discharging into the well D. K are discharge pipes leading from the bottom of the well D. L are rakes attached to the revolving pipe G, and having fingers $l$, which, being situated immediately in front of the vertical portions of the coils, serve to protect the latter, and to thoroughly stir and agitate the mass, so as to constantly bring fresh portions in contact with the coil.

I claim herein as new and of my invention—

1. The arrangement of tun A, central annular waste-way D, rotary centrally discharging coils J, central supply pipes G I, stuffing-box H, and rake L, for the purpose set forth.

2. In the described combination the rotary coils J, discharging into a central waste-way, D, in the manner set forth.

In testimony of which invention I hereunto set my hand.

FRANKLIN P. BUSH.

Witnesses:
GEO. H. KNIGHT,
JAMES H. LAYMAN.